United States Patent
Heo et al.

[11] Patent Number: 6,148,125
[45] Date of Patent: Nov. 14, 2000

[54] GE-GA-S-BASED GLASS COMPOSITION HAVING LIGHT AMPLIFYING CHARACTERISTIC AND APPARATUS FOR OPTICAL COMMUNICATIONS USING THE SAME

[75] Inventors: Jong Heo, Pohang; Yong-beom Shin; Se-ho Park, both of Seoul; Dong-wook Shin, Suwon; Hyoun-soo Kim, Sungnam, all of Rep. of Korea

[73] Assignee: SamSung Electronics Co., Ltd., Suwon, Rep. of Korea

[21] Appl. No.: 09/185,734

[22] Filed: Nov. 4, 1998

[30] Foreign Application Priority Data

Nov. 4, 1997 [KR] Rep. of Korea ............... 97/57997

[51] Int. Cl.$^7$ ............... G02B 6/26
[52] U.S. Cl. ............... 385/31; 385/122; 385/144; 385/123; 359/341; 501/37
[58] Field of Search ............... 385/31, 144, 122, 385/123; 372/6, 39; 359/341; 501/40, 37; 427/126.3; 430/567, 139, 270.13, 399

[56] References Cited

U.S. PATENT DOCUMENTS

| | | | |
|---|---|---|---|
| Re. 36,513 | 1/2000 | Aitken et al. | 385/144 |
| 5,379,149 | 1/1995 | Snitzer et al. | 359/341 |
| 5,764,661 | 6/1998 | Tawarayama et al. | 372/6 |
| 5,973,824 | 10/1999 | Sanghera et al. | 385/142 X |
| 5,991,486 | 11/1999 | Braglia | 385/123 |

*Primary Examiner*—Phan T. H. Palmer
*Attorney, Agent, or Firm*—Robert E. Bushnell, Esq.

[57] ABSTRACT

A Ge—Ga—S-based glass composition having light amplifying characteristics and an apparatus for optical communications using the glass composition are provided. The present invention includes a sulfur-poor Ge—Ga—S based host glass which includes less S than compositions on the composition line of $GeS_2$—$G_2S_3$ on the ternary phase diagram of Ge—Ga—S, and a rare earth active material doped on the host glass for luminescence and light amplification. Ga of no more than about 10 mol % is included in the host glass. Also, $Pr^{3+}$ ions are used as the rare earth active material. Furthermore, for stable vitrification and a blue shift of a short wavelength absorption band, a vitrification stabilizer such as Br and I is added to the host glass. Also, the present invention includes an apparatus for performing optical communications such as a light amplifier using optical fiber comprised of the glass composition including the S-poor Ge—Ga—S host glass which includes less S than a glass on a composition line of $GeS_2$—$Ga_2S_3$ and the rare earth active material doped on the host glass for the light amplification.

20 Claims, 3 Drawing Sheets

GE-GA-S-BASED GLASS COMPOSITION HAVING LIGHT AMPLIFYING CHARACTERISTIC AND APPARATUS FOR OPTICAL COMMUNICATIONS USING THE SAME

CLAIM OF PRIORITY

This application makes reference to, incorporates the same herein, and claims all benefits accruing under 35 U.S.C. §119 from an application for Ge—Ga—S-BASED GLASS COMPOSITION HAVING LIGHT AMPLIFYING CHARACTERISTIC AND APPARATUS FOR OPTICAL COMMUNICATIONS USING THE SAME earlier filed in the Korean Industrial Property Office on Nov. 4, 1997 and there duly assigned Ser. No. 57997/1997.

BACKGROUND OF THE INVENTION

1. Field of the Invention

The present invention relates to a glass composition used for the fabrication of an optical device, and more particularly to a glass composition for an optical fiber used in light amplification. It also relates to an apparatus for optical communications using the glass composition.

2. Description of the Related Art

Silica glass fiber doped with an active material, i.e., erbium (Er) is currently used as the optical fiber in a light source such as a laser oscillator of a single wavelength used for optical communications, a superluminescent source of radiation, or an amplifier of radiation. The silica glass fiber doped with Er is used for amplifying a 1.5 µm wavelength signal.

An optical fiber used for amplifying a 1.31 µm wavelength signal which is the Zero dispersion bandwidth of silica glass has not, however, been successfully developed. Two rare earth elements are potentially useful as the active material in an optical fiber used for optical amplification of the 1.3 µm wavelength signal: neodymium (Nd) and praseodymium (Pr) which would be doped on a host glass. (By way of definition, a glass which is not doped with an active material will be referred to as host glass. The term glass composition will mean a host glass doped an the active material.) The rare earth element is doped in an ionic state, such as $Nd^{3+}$ or $Pr^{3+}$ ions, on a host glass such as silica glass.

However, in the case of including the $Nd^{3+}$ ion, the center of the luminescence waveband generated by the transition of the $Nd^{3+}$ ion from $^4F_{3/2}$ level to $^4F_{13/2}$ level is about 1.35 µm, which is considerably spaced from the Zero dispersion bandwidth. Also, the luminescence at 1.35 µm is weaker than those of other emissions generated from the $^4F_{3/2}$ level, for example, 0.89 µm and 1.064 µm. Furthermore, the gain of light of wavelength shorter than 1.36 µm is remarkably reduced by an excited state absorption in the $^4F_{3/2}$ level.

In the case of adding the $Pr^{3+}$ ion, light generated by the transition between a higher energy level $^1G_4$ and a lower energy level $^3H_5$ is used as a signal. Here, the probability of this transition is much larger than the probability of the transition from the $^1G_4$ to other energy levels than the $^3H_5$. However, the difference of an energy gap between the $^1G_4$ level and the $^3F_4$ energy level which is right below the $^1G_4$ level is about 3,000 $cm^{-1}$. Therefore, in the case of using oxide glass having a large lattice vibration energy (>800 $cm^{-1}$) as a host material the probability theat the energy of an electron excited to the $^1G_4$ level in $Pr^{3+}$ ion is consumed by nonradiative transfer increases with the relaxation of lattice vibration energy. As a result, the light amplification efficiency becomes low. Therefore, it is necessary to use glass having a low lattice vibration energy as the material of the host.

One such system for a host glass having a low lattice vibration energy is disclosed in U.S. Pat. No. 5,379,149, to Snitzer et al., entitled *Glass Composition Having Low Energy Phonon Spectra And Light Sources Fabricated Therefrom*. The patent discusses a host glass having a composition in which excess S is added in a ratio higher than S ratio on a composition line which connects $GeS_2$ and $Ga_2S_3$ in a ternary system phase diagram of germanium (Ge), gallium (Ga) and sulfur (S). This is referred to as a sulfur-rich glass. In particular, the patent discusses a composition of Ga, S and Ge with the above limitation and further limited to values of S less than 75 mol % and Ga less than 10 mol %. The composition with 25 mol % Ge, 5 mol % Ga and 70 mol % S, which may also be represented $Ge_{25}Ga_5S_{70}$, was about at the center of the discussed composition region on the ternary phase diagram.

The host glass of the $Ge_{25}Ga_5S_{70}$ composition has a higher solid solubility of the $Pr^{3+}$ ion than the host glass of conventional Ge—S, As—S, or Ge—As(P, Sb)—S based compositions. However, when the $Pr^{3+}$ ions is added at high concentration, agglomeration of the $Pr^{3+}$ ions occurs. The agglomeration of the $Pr^{3+}$ ions causes the energy transfer rate between the $Pr^{3+}$ ions to greatly increase. Therefore, the luminescence by the $^1G_4$ level life is reduced and the light amplification efficiency is lowered.

Based on our observations of the art, we have found that what is needed is a glass composition for light amplification which has a low lattice vibration energy to permit efficient luminescence from the rare earth ion, but which prevents agglomeration of the rare earth ions thereby further enhancing the luminescence.

SUMMARY OF THE INVENTION

It is therefore an object of the present invention to provide an improved glass composition for an optical fiber.

It is another object of the present invention to provide an improved glass composition for optical fiber used in light amplification and luminescence applications.

It is a further object to provide an improved optical fiber for use in optical communication.

It is a still further object to provide glass composition in which the active material has improved luminescence.

It is a still yet further object to provide a glass composition with improved light amplification efficiency.

It is a yet further object to provide a glass composition in which agglomeration of the active material is prevented.

It is yet another object to provide a glass composition using a Ge—Ga—S host glass and rare earth ions as active material which allows stable vitrification.

It is still another object to provide an improved apparatus for optical communications using the glass composition of the present invention.

Accordingly, to achieve these objects, there is provided a glass composition having luminescence and light amplification characteristics, including a sulfur-poor Ge—Ga—S host glass which includes less S than a glass on a composition line for connecting $GeS_2$ to $Ga_2S_3$ in a ternary phase diagram of Ge, Ga, and S, and including a rare earth active material doped on the host glass for luminescence and light amplification. Preferably, the host glass includes Ga of no more than 10 mol %. Preferably, the host glass is a Ge—Ga—S glass having a composition of $Ge_{32.5}Ga_5S_{62.5}$ or $Ge_{28.3}Ga_{10}S_{61.7}$. Furthermore, the rare earth active material doped on the host glass is $Pr^{3+}$ ions. Also, the glass composition further comprises an additive, which is a halogen element such as Br and I, which functions as a vitrification stabilizer for the host glass and functions to cause a blue shift of a short wavelength absorption band. Preferably, the glass composition comprises the host glass in a ratio of no less than 85 mol %, and the additive in a ratio of 0.1 mol % through 15 mol %.

There is provided a glass composition, comprising a S-poor Ge—Ga—S host glass which includes less S than a glass on a composition line for connecting $GeS_2$ to $Ga_2S_3$ in a ternary phase diagram of Ge, Ga, and S, an additive included in the host glass, which yields a stable vitrification of the host glass and a blue shift of a short wavelength absorption band, and a rare earth active material doped on the host glass for luminescence and light amplification. Preferably, the host glass includes Ga at about no more than 10 mol %. The additive is Br or I. Preferably, the glass composition comprises the host glass in a ratio of no less than 85 mol %, and including the additive in a ratio of 0.1 mol % through 15 mol %.

There is further provided an apparatus for performing light communication, including a means for generating a radiation signal and a optical pumping and supplying them to optical fiber, where the optical fiber includes of a glass composition including S-poor Ge—Ga—S host glass which includes less S than a glass on a composition line for connecting $GeS_2$ to $Ga_2S_3$ in a ternary phase diagram of Ge, Ga, and S, and means for preventing the light emitted from the optical fiber from being reflected back to the optical fiber. Preferably, the host glass comprises Ga of about no more than 10 mol %. The means for generating the optical signal and the optical pumping and supplying them to the optical fiber comprises a sub-means for generating the optical signal and the optical pumping and a coupler for coupling the optical signal and the optical pumping. Also, a Faraday isolator is used as the means for preventing the light from being reflected back to the optical fiber. The rare earth active material is $Pr^{3+}$ ions. Also, the host glass comprises S of about no more than 67 mol %, Ga of about no more than 10 mol %, and Ge of about no more than 40 mol %. Preferably, the host glass is a Ge—Ga—S glass having a composition of $Ge_{32.5}Ga_5S_{62.5}$ or $Ge_{28.3}Ga_{10}S_{61.7}$. Furthermore, the glass composition further comprises an additive such as a halogen element such as Br and I, to serve as a vitrification stabilizer for the host glass and to cause a blue shift of a short wavelength absorption band. Preferably, about 0.1 mol % to 15 mol % of halogen element is further added to the glass composition.

According to the present invention, it is possible to realize a glass composition including a host glass of a Ge—Ga—S and rare earth ions, which can prevent agglomeration of the active material and yield improved light amplification efficiency. Also, it is possible to realize a glass composition which allows stable vitrification. Furthermore, it is possible to realize a light amplifyg apparatus for performing optical communications by which it is possible to increase the light amplification efficiency by using optical fiber comprised of the glass composition.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Now, embodiments of the present invention will be described in detail with reference to the attached drawings. However, the present invention is not restricted to the following embodiments and many variations are possible within the scope and spirit of the present invention by anyone skilled in the art. The elements marked with the same reference signals are the same.

Figure 2:
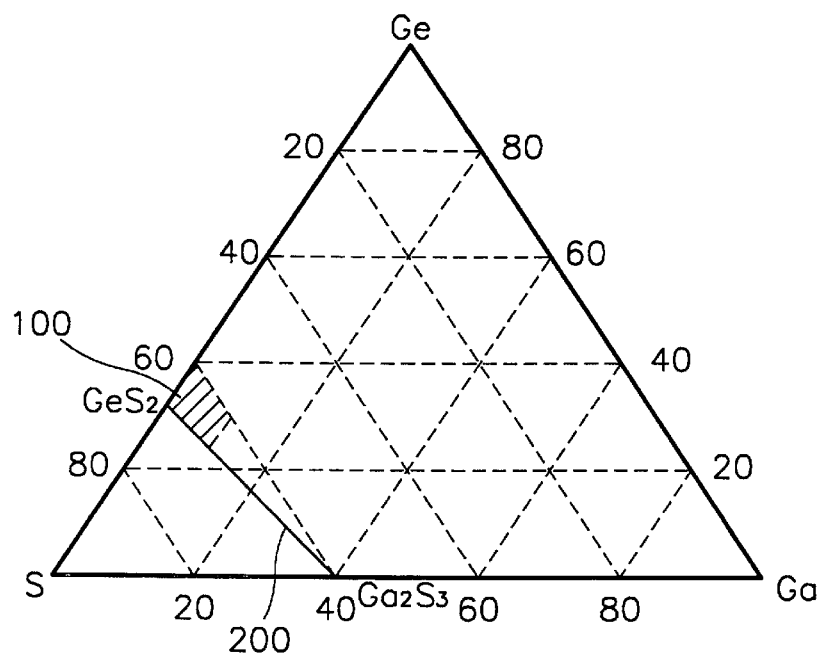
FIG. 2 is a ternary phase diagram of Ge—Ga—S glass for describing the composition range of the glass composition according to the present invention.

Turning to the figures, FIG. 2 shows ternary phase diagram of Ge, Ga, and S according to the present invention. Here, reference numeral 100 denotes a set of sulfur-poor glass compositions according to the present invention. These are sulfur-poor with respect to compositions corresponding to mixtures of $GeS_2$ and $Ga_2S_3$. In an embodiment according to the present invention, the inventive glass composition includes a Ge—Ga—S host glass which includes less S than a glass on the $GeS_2$ to $Ga_2S_3$ composition line, that is, the straight line connecting $GeS_2$ and $Ga_2S_3$ on the ternary phase diagram as shown in FIG. 2. The inventive composition also includes a rare earth active material doped on the host glass to perform luminescence and light amplification operations. That is, the Ge—Ga—S glass having less S than the glass on the $GeS_2$ to $Ga_2S_3$ composition line 200 shown in FIG. 2 is used as the host glass. For example, as shown in FIG. 2, the inventive host glass falls within the area marked with the reference numeral 100 in the ternary phase diagram of Ge—Ga—S.

Therefore, the host glass includes less sulfur than glass on a composition line connecting $GeS_2$ to $Ga_2S_3$ in a Ge—Ga—S ternary phase diagram, for example, S of no more than 66.67 mol %, Ga of no more than 10 mol %, and Ge of not more than 40 mol %. Compositions of approximately $Ge_{32.5}Ga_5S_{62.5}$, that is, 32.5 mol % Ge, 5.0 mol % Ga and 62.5 mol % S, and $Ge_{28.3}Ga_{10}S_{61.7}$, that is 28.3 mol % Ge, 10.0 mol % Ga and 61.7 mol % S, are two representative examples of a Ge—Ga—S host glass having the above composition range. Hereinafter, the present embodiment will be described based on the host glass of the above two compositions. However, the present invention is not restricted to the host glass of the above compositions.

The glass composition is formed by doping the rare earth ion, i.e., the $Pr^{3+}$ ion, as the active material on the above host glass. The glass composition of the present invention has a higher solid solubility with respect to the rare earth ion than the sulfur-rich Ge—Ga—S based glass composition discussed earlier. Therefore, the rare earth ions can be doped on the host glass more homogeneously due to the increase in the limit of the solid solubility. The theoretical basis on which the increase of the limit of the solid solubility realizes higher homogeneity is as follows.

When host glasses of Ge—S, As—S, and Ge—As(P, Sb)—S based compositions include S in a composition ratio equal to or larger than a stoichiometric composition ratio, the solid solubility of the rare earth elements is about several hundred ppm. Also, when more rare earth elements are included in the host glass, the included rare earth ions form a fine agglomeration in the host glass. Also, due to the agglomeration of the rare earth ions, a fine crystal is extracted, which shows loss in transmitted light.

However, in the host glasses of the Ge—S, As—S, and Ge—As(P,Sb)—S based compositions, when there is less S since the composition ratio of S is lowered, the rare earth ions can have a solid solubility of about several thousand ppm. Such a phenomenon is related to the change in the structure of the host glass according to the amount of S. In the sulfur-poor host glass, a metal combination between positive ions exists. More rare earth ions are soluble due to this metal combination.

The limit of the solid solubility of the included rare earth-based ions is higher in the glass composition using the sulfur-poor Ga—Ge—S based host glass according to the present invention than in the sulfur-rich glass technology. It is possible to reduce the probability of occurrence of a nonradiative transmission by the increased limit of the solid solubility.

Figure 1:
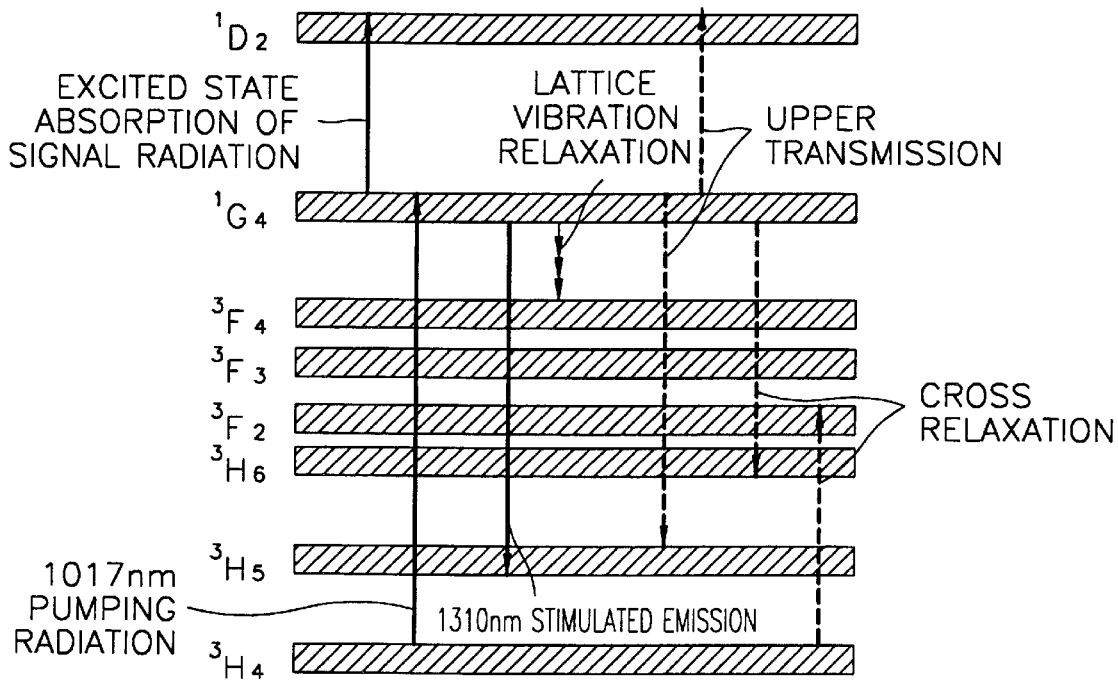
FIG. 1 schematically shows the energy level diagram of a $Pr^{3+}$ ion.

Referring to FIG. 1, the factor which greatly affects the luminescence life and the light amplification efficiency of the $^1G_4$ level of the $Pr^{3+}$ ion is the nonradiative transmission in which the energy of $Pr^{3+}$ excited to the $^1G_4$ level is emitted in forms other than light. There are two mechanisms in the nonradiative transmission. One is a multiple lattice vibration relaxation by a lattice vibration of the host glass caused by a small energy gap between the $^1G_4$ level which is stable and the $^3F_4$ level which is right below the $^1G_4$ level and the other is an energy transfer between the $Pr^{3+}$ ions.

Energy transfer paths between ions for reducing the density of the electrons of the $^1G_4$ level of the $Pr^{3+}$ ions are as follows. The $Pr^{3+}$ ion excited to the $^1G_4$ level transitions to a $^1D_2$ level which is an upper level by absorbing the energy of another excited $Pr^{3+}$ ion. The $Pr^{3+}$ ion in the $^3H_4$ level is excited to a $^3F_2$ level by absorbing the energy of another $Pr^{3+}$ ion in the $^1G_4$ level and the $Pr^{3+}$ ion in the $^1G_4$ level is lowered to a $^3H_6$ level, in a process called cross-relaxation.

The energy transfer rate according to an energy transfer phenomenon between the $Pr^{3+}$ ions is dependent on the distance between ions. The energy transfer rate, or speed, is inversely proportional to the distance between ions if the energy transfer mechanism the electrostatic interaction. When electric dipole-dipole interaction is the energy transfer mechanism, the energy transfer rate is inversely proportional to the sixth power of the distance between the ions. When electric dipole-quatropole interaction is the energy transfer mechanism, the energy transfer rate is inversely proportional to the eighth power of the distance between the ions. When electric quatropole-quatropale interaction is the energy transfer mechanism, the energy transfer rate is inversely proportional to the tenth power of the distance between the ions.

Therefore, when the added rare earth active material, i.e., the $Pr^{3+}$ ions are not homogeneously distributed in the host glass and exist in an agglomeration state, the energy transfer rate is very much larger than that of the ideal state in which the ions are homogeneously distributed. Accordingly, the luminescence life of the $^1G_4$ level of the $Pr^{3+}$ ion is reduced. As a result, the light amplification efficiency is remarkably reduced.

However, since the host glass according to the present embodiment is the S-poor Ge—Ga—S glass, rare earth ions are soluble at levels of at least several thousand ppm. That is, the host glass has a high solid solubility with respect to the rare earth ions. Therefore, it is possible to prevent agglomeration of the rare earth ions. Therefore, the rare earth ions doped as the active material, for example, the $Pr^{3+}$ ions can be more homogeneously distributed in the S-poor Ge—Ga—S based host glass according to the present embodiment. Consequently, it is possible to reduce the probability of the nonradiative transmission by the energy transfer between ions. Accordingly, it is possible to improve the light amplification efficiency by reducing the non-radiation transmission probability.

The glass composition according to the above-mentioned present invention is formed as follows. However, the formation of the glass composition according to the present invention is not restricted to the following method. The glass composition can be formed by a general glass manufacturing technology.

Very pure Ge, Ga, and S of about 99.999% to 99.9999% purity are used as starting materials. Also, as the active material, high-purity Pr of about 99.99% is used as the starting material. At this time, about 5,000 ppm of Pr is included. The material is weighed so that an entire batch is about 10 g based on the composition of the host glass. The weighing is performed in a glove box under an Ar atmosphere. The batch weighed as mentioned above is put into a silica ampule and the silica ampule is sealed under vacuum. The ampule is pulled in an agitating furnace and is fused at a temperature of about 950° C. for about 12 hours. Then, the ampule is air-quenched, thus obtaining a vitrified glass composition. The glass composition is annealed at around a glass transition temperature.

The luminescence spectrum of the 1.3 µm wavelength of the glass composition obtained by the above-mentioned manufacturing method is obtained as follows. The $Pr^{3+}$ ions are excited to the $^1G_4$ level in the glass composition using the optical pumping of 1020 nm wavelength of a Ti-sapphire laser driven by an $Ar^+$ laser. Then, the wavelength of the luminescence generated in the glass composition is segregated using a ¼ m double monochromator. The luminescence is detected by an InGaAs PIN photodetector and the detected luminescence is analyzed by a lock-in amplifier to which a computer is connected. The luminescence lifetime is defined to be the time at which the strength of the luminescence becomes 1/e of the initial one using a digitized oscilloscope.

The optical characteristic of the glass composition according to the present invention is compared with the optical characteristic of a glass composition including the conventional host glass of the sulfur-rich Ge—Ga—S. The host glass of the composition according to the present invention and the host glass according to the sulfur-rich technology are prepared using the above-mentioned manufacturing conditions. About 5,000 ppm of $Pr^{3+}$ ions are added to each of the two kinds of host glasss. The glass of $Ge_{32.5}Ga_5S_{62.5}$ is used as the host glass according to the present invention. The glass of $Ge_{25}Ga_5S_{70}$ is used as the host glass according to the conventional, sulfur-rich technology. The comparison results are shown in Table 1.

TABLE 1

Luminescence Life and Quantum Efficiency According to the Composition of the host glass

| composition of host glass | calculated luminescence life $\tau_R$ ($\mu s$) | measured luminescence life $\tau_M$ ($\mu s$) | quantum efficiency (%) |
|---|---|---|---|
| $Ge_{25}Ga_5S_{70}$ | 783 | 123 | 16 |
| $Ge_{32.5}Ga_5S_{62.5}$ | 507 | 160 | 31 |

Referring to Table 1, in the case of using the conventional host glass of $Ge_{25}Ga_5S_{70}$, the luminescence life of the $^1G_4$ level is about 123 $\mu s$ and the quantum efficiency defined as the ratio of the measured value ($\tau_M$) to the calculated value ($\tau_R$) is about 16%. In the case of using the host glass of $Ge_{32.5}Ga_5S_{62.5}$ according to the present invention, the luminescence life increases to about 160 $\mu s$ and the quantum efficiency increases to 31%. Though the same density of $Pr^{3+}$ ions is added to each of the two kinds of host glasss, the luminescence lifetime and the quantum efficiency in the sulfur poor host glass according to the present invention is longer and better. This means that the added $Pr^{3+}$ ions are more homogeneously distributed in the inventive host glass than in the conventional host glass. Also, this suggests that the non-radiative transfer rate due to the energy transfer between ions can be reduced in the case of using the host glass according to the present invention.

Figure 3:
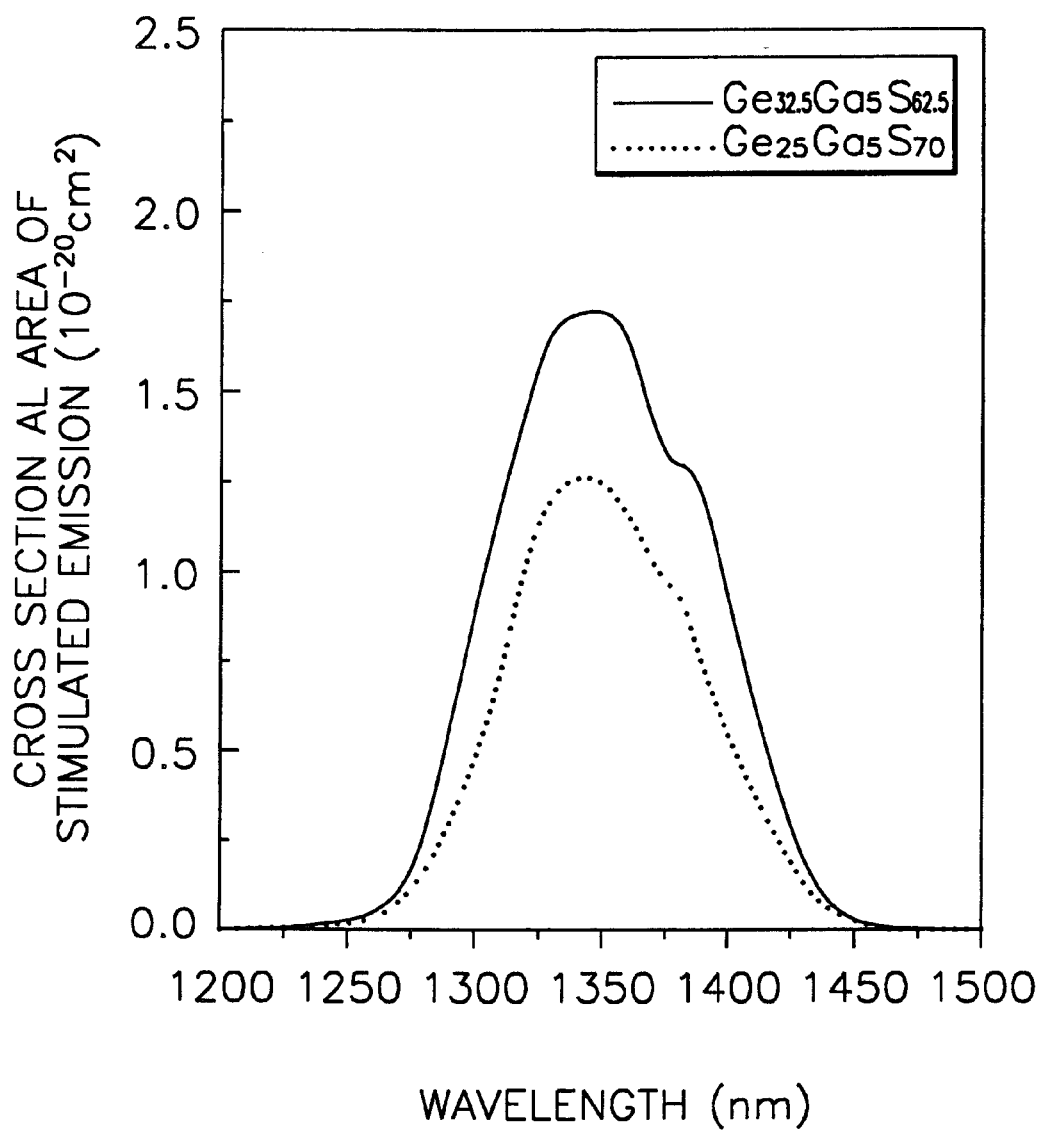
FIG. 3 shows a graph of the emission cross sectional area from the $^1G_4$ state to the $^3H_5$ state of the $Pr^{3+}$ ion doped in the glass compositions according to the present invention versus the wavelength.

FIG. 3 shows the cross-sectional area of the stimulated emission from the $^1G_4$ level to the $^3H_5$ level of the $Pr^{3+}$ ions doped in the glass composition versus the present invention versus the wavelengths. When the light amplifier and the laser oscillator are designed, the threshold strength ($P_{th}$) of the optical pumping is related to the light amplification efficiency. Also, the threshold strength of the optical pumping is inversely proportional to the value obtained by multiplying the luminescence life of the $^1G_4$ level by the stimulated emission cross-sectional area. Therefore, as the emission cross sectional area shown in FIG. 3 becomes larger, the light amplification efficiency increases. In the case of using the conventional host glass of $Ge_{25}Ga_5S_{70}$, the stimulated emission cross-sectional area of the $Pr^{3+}$ ion at the 1.31 $\mu m$ wavelength is about $6.78 \times 10^{-21}$ cm$^2$. In the case of using the host glass according to the present invention of the composition $Ge_{32.5}Ga_5S_{62.5}$, the stimulated emission cross-sectional area at the 1.31 $\mu m$ wavelength is about $9.92 \times 10^{-21}$ cm$^2$. Such a result is related to the generation of the metal combination in the sulfur-poor composition. The generation of the metal combination increases the refractive index and the probability of transmission from the $^1G_4$ level to the $^3H_5$ level.

As mentioned above, it is possible to increase the luminescence lifetime of the $^1G_4$ level of the rare earth ion added as the active material, i.e., the $Pr^{3+}$ ion by using the host glass of the sulfur-poor Ge—Ga—S based composition. Also, it is possible to increase the stimulated emission cross-sectional area at the 1.31 $\mu m$ wavelength, thus increasing the light amplification efficiency.

Figure 4:
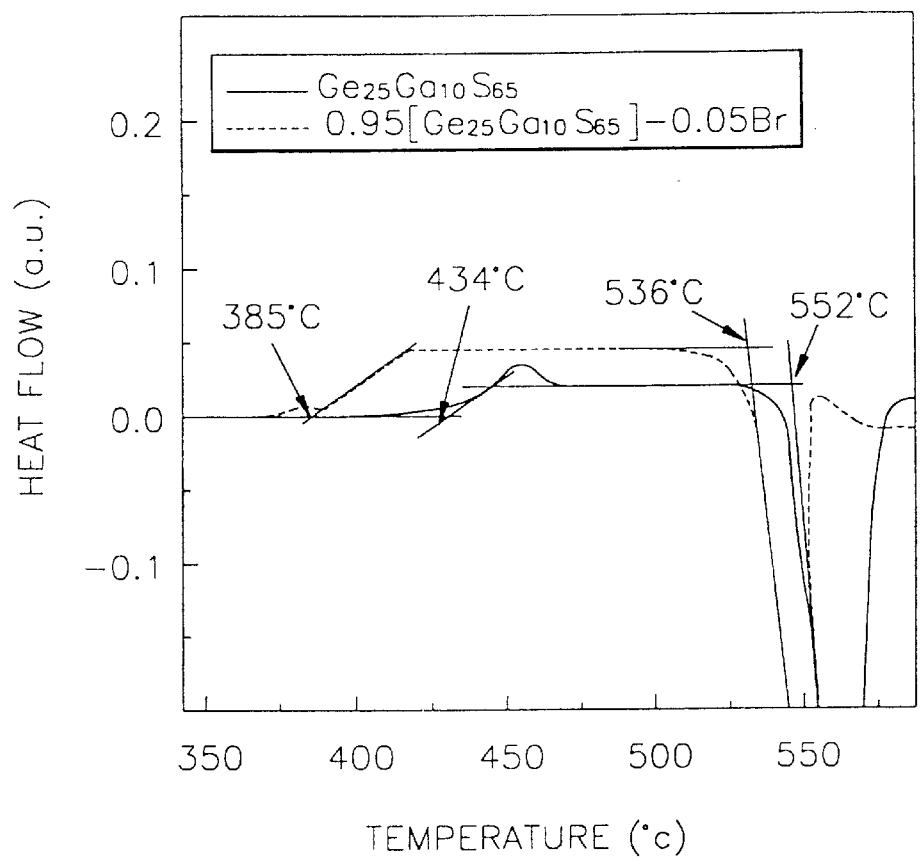
FIG. 4 shows glass transition temperature and crystallization temperature of the glass compositions according to the present invention, as measured by a differential scale calorimeter (DSC).

FIG. 4 shows the glass transition temperature ($T_g$) and crystallization temperature ($T_x$) of the host glass, measured using a differential scale calorimeter (DSC). The stability of vitrification may be reduced in the host glass of the sulfur-poor composition. In particular, the following problems may occur in designing the sulfur-poor host glass. First, it is not possible to infinitely reduce the composition ratio of S. When there is an insufficient amount of S, a metal combination is generated in the host glass and thus the short wavelength transmission limit of the host glass rapidly moves toward the direction of near infrared light. In this case, the host glass can absorb the wavelength of the optical pumping. As a result, the host glass may be damaged by the optical pumping according to the generation of the metal combination. Second, the host glass including S is difficult to vitrify as the composition ratio of S decreases. Accordingly, it is not possible to stably vitrify the host glass.

Therefore, in the present embodiment, a vitrification stabilizer is added to the sulfur-poor Ge—Ga—S-based glass composition such as $Ge_{32.5}Ga_5S_{62.5}$ or $Ge_{28.3}Ga_{10}S_{61.7}$ doped with the rare earth active material. It is preferable that a halogen element is used as the vitrification stabilizer. At this time, Br or I is used as the halogen element. About 0.1 mol % to 15 mol % of the halogen element is added to the glass composition. The vitrification of the S-poor Ge—Ga—S-based glass composition is stabilized by added halogen element. Accordingly, even though there is little S, the S-poor Ge—Ga—S host glass can be vitrified without precipitating crystals in the host glass. That is, the vitrification can be obtained in a composition range having lower S.

Furthermore, a blue shift of a short wavelength absorption band can be realized by adding halogen in the glass composition. Therefore, it is possible to prevent the optical pumping from being absorbed into the glass composition used as the host of the optical pumping and the glass composition from being damaged by the optical pumping.

The efficiency obtained by adding the halogen element to the Ge—Ga—S based host glass as the vitrification stabilizer is measured using the host glass of $Ge_{25}Ga_{10}S_{65}$ as an example. The glass transition temperature and crystallization temperature of the glass composition measured using a glass composition including by 5 mol % of Br and 95% of $Ge_{25}Ga_{10}S_{65}$, i.e., the glass composition of 0.95 $(Ge_{25}Ga_{10}S_{65})$–0.05Br and the glass composition of $Ge_{25}Ga_{10}S_{65}$. The measurement results are shown in FIG. 4. The glass composition of 0.95$(Ge_{25}Ga_{10}S_{65})$–0.05Br is an example of the glass composition according to the present invention and does not limit the present invention.

The vitrification stability is generally proportional to the difference between the crystallization temperature and the glass transition temperature ($T_x$-$T_g$). Referring to FIG. 4, the glass composition of 0.95$(Ge_{25}Ga_{10}S_{65})$–0.05Br according to the present invention has a $T_g$ of 385° C. and a $T_x$ of 536° C. Therefore, $T_x$-$T_g$ is about 151° C. The host glass of $Ge_{25}Ga_{10}S_{65}$ has $T_g$ of 434° C. and $T_x$ of 552° C. Therefore, $T_x$-$T_g$ is about 118° C. It is noted that the stability with respect to the crystallization of the glass, i.e., the vitrification stability is much higher in the glass composition of 0.95 $(Ge_{25}Ga_{10}S_{65})$–0.05Br according to the present invention than in the host glass of $Ge_{25}Ga_{10}S_{65}$. Therefore, it is possible to prevent precipitation of crystals in the optical fiber by manufacturing the optical fiber using the glass composition according to the present invention. It is thus possible to prevent optical loss due to the precipitated crystals.

Figure 5:
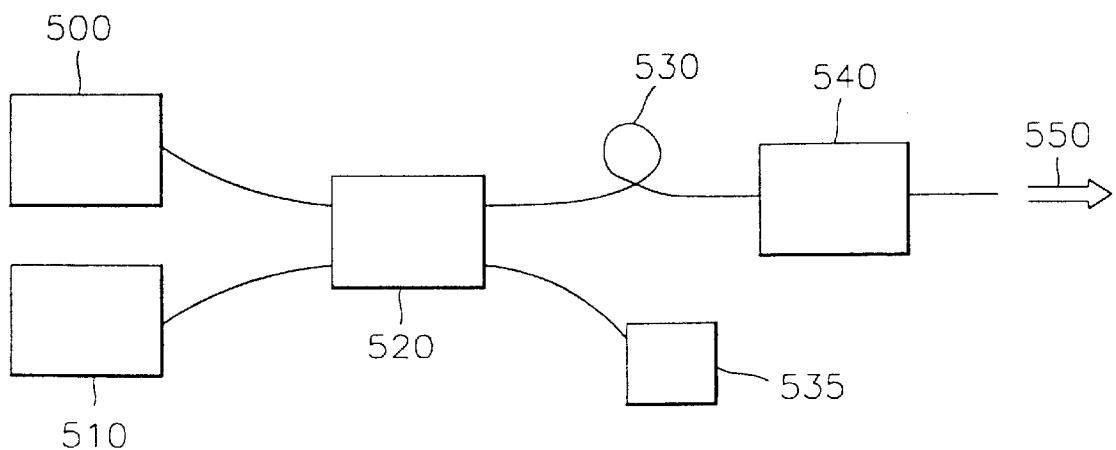
FIG. 5 schematically shows a light amplifier using optical fiber composed of the glass composition according to the present invention.

FIG. 5 schematically shows an embodiment of an apparatus for performing optical communications using the glass composition according to the present invention. Hereinafter, in the present embodiment, a light amplifier will be referred to as an embodiment of an optical apparatus to which the glass composition according to the present invention is applied as the apparatus for optical communications. However, the present invention is not restricted to a light amplifier. The glass composition according to the present invention can be applied to a light source apparatus such as a laser oscillator and a luminescence apparatus.

As shown in FIG. 5, the light amplifier according to the present invention includes means 500, 510, and 520 for generating a optical signal and a optical pumping and supplying light to optical fiber 530, where the optical fiber 530 includes a sulfur-poor Ge—Ga—S host glass which has less S than a glass on a composition line of $GeS_2$—$Ga_2S_3$, and includes a rare earth active material doped on the host to perform light amplification; and a means 540 for preventing light emitted from the optical fiber 530 from being reflected back to the optical fiber 530. Preferably, the optical signal supplied from a signal source 500 and the optical pumping supplied from the laser source 510, for example, optical pumping having a wavelength such as 1020 nm, are united and coupled in the dispersive coupler 520. The united and coupled light is supplied to the optical fiber 530. At this time, some of the light obtained by uniting and coupling the optical signal and the optical pumping is allotted to a monitor 535 so that it can be monitored. About 90% of light is coupled to the optical fiber 530.

The optical fiber 530 is comprised of the Ge—Ga—S host glass which comprises less S than glass on the composition line of $GeS_2$—$Ga_2S_3$, for example, $Ge_{32.5}Ga_5S_{62.5}$ or $Ge_{28.3}Ga_{10}S_{61.7}$ and the rare earth active material doped on the host to perform the light amplification, for example, the $Pr^{3+}$ ions. Here, the glass composition preferably further comprises the halogen element such as I or Br. The glass composition amplifies the light having a wavelength of 1.31 $\mu$m as mentioned above. Also, a Faraday isolator is used as the means 540 for preventing the light emitted from the optical fiber 530 from being reflected back to the optical fiber 530. The light 550 which passes through the optical fiber 530 and the Faraday isolator has a wavelength of about 1.31 $\mu$m.

According to the above-mentioned present invention, it is possible to increase the limit of the solid solubility of the rare earth ions used as the active material doped on the host glass, i.e., the $Pr^{3+}$ ion, by using the sulfur poor Ge—Ga—S host glass. Therefore, it is possible to homogeneously distribute the rare earth ions. Accordingly, it is possible to increase the luminescence lifetime and the optical gain of the $^1G_4$ level of the $Pr^{3+}$ ion. Therefore, it is possible to increase the light amplification efficiency of the wavelength of 1.31 $\mu$m.

Also, it is possible to increase the vitrification stability of the host glass by adding a halogen element such as Br and I to the S poor Ge—Ga—S host glass. Therefore, it is possible to prevent the optical loss caused by the precipitation of crystals in a process of processing the optical fiber using the glass composition.

Furthermore, it is possible to increase the light amplification efficiency of the light amplifier by using the optical fiber comprised of the glass composition according to the present invention including the S-poor Ge—Ga—S host glass and the active material.

What is claimed is:

1. A glass composition for an optical device, comprising:
    a host glass comprising germanium, gallium and sulfur, where the molar proportion of sulfur is less than that in the line connecting $GeS_2$ and $Ga_2S_3$ in a ternary phase diagram of germanium, gallium and sulfur; and
    a rare earth material.

2. The glass composition of claim 1, in which the molar proportion of gallium in said host glass is less than about 10 mol-%.

3. The glass composition of claim 2, in which the molar proportion of sulfur in said host glass is greater than about 60 mol-%.

4. The glass composition of claim 1, in which said host glass has molar proportions of approximately 32.5% germanium, 5.0% gallium and 62.5% sulfur.

5. The glass composition of claim 1, in which said host glass has molar proportions of approximately 28.3% germanium, 10.0% gallium and 61.7% sulfur.

6. The glass composition of claim 1, in which the rare earth material comprises Pr.

7. The glass composition of claim 1, further comprising a vitrification stabilizer which increases the difference between the crystallization temperature and the glass transition temperature of the glass formed from the composition.

8. The glass composition of claim 1, further comprising a blue-shift additive which causes a blue-shift in the short wavelength absorption band of the glass formed from the composition.

9. The glass composition of claim 1, further comprising a halogen element.

10. The glass composition of claim 9, in which said halogen element is present in the range of approximately 0.1 to 15 mol-%, and the molar proportion of said host glass is at least about 85 mol-%.

11. The glass composition of claim 1, further comprising I or Br.

12. The glass composition of claim 11, in which I or Br is present in the range of approximately 0.1 to 15 mol-%, and the molar proportion of said host glass is at least about 85 mol-%.

13. The glass composition of claim 1, further comprising an additive, said additive increasing the difference between the crystallization temperature and the glass transition temperature of the glass formed from the composition, and said additive causing a blue-shift in the short wavelength absorption band of the glass formed from the composition.

14. An apparatus for performing communication by light, comprising:
    means for generating an optical signal;
    means for generating optical pumping and applying said optical pumping to an optical fiber;
    said optical fiber comprising a host glass comprising germanium, gallium and sulfur, where the molar proportion of sulfur is less than that in the line connecting $GeS_2$ and $Ga_2S_3$ in a ternary phase diagram of germanium, gallium and sulfur; and
    means for preventing the light emitted by said optical fiber from being reflected back to said optical fiber.

15. The apparatus of claim 14, further comprising a coupler for coupling said optical signal and said optical pumping.

16. The apparatus of claim 14, further comprising a Faraday isolator as the means for preventing the light from being reflected back to said optical fiber.

17. The apparatus of claim 14, where the molar proportion of gallium in said host glass is less than about 10 mol %.

18. The apparatus of claim 14, where said optical fiber further comprises a halogen element.

19. The apparatus of claim 14, where said optical fiber further comprises Br or I.

20. The apparatus of claim 14, where said optical fiber further comprises an additive, said additive increasing the difference between the crystallization temperature and the glass transition temperature of the optical fiber, and said additive causing a blue-shift in the short wavelength absorption band of the optical fiber.

* * * * *